United States Patent [19]

Masclaux

[11] Patent Number: 4,700,765
[45] Date of Patent: Oct. 20, 1987

[54] RADIAL CARCASS PNEUMATIC TIRE HAVING TWO BEAD RINGS PER BEAD

[75] Inventor: Pierre Masclaux, Enval, France

[73] Assignee: Compagnie Generale des Etablissements Michelin, Clermont-Ferrand, France

[21] Appl. No.: 754,066

[22] Filed: Jul. 11, 1985

[30] Foreign Application Priority Data

Jul. 19, 1984 [FR] France ................................ 84 11750

[51] Int. Cl.$^4$ ...................... B60C 15/05; B60C 15/024
[52] U.S. Cl. ..................................... 152/545; 152/542; 152/552; 152/DIG. 9
[58] Field of Search .................. 152/379.3, 542, 379.5, 152/552, 381.4, 450, 539, 540, 544, 545, 548, 553, DIG. 9, DIG. 17

[56] References Cited

U.S. PATENT DOCUMENTS

| 1,349,902 | 8/1920 | Midgley | 152/545 |
| 1,403,091 | 1/1922 | Midgley | 152/545 X |
| 1,548,370 | 8/1925 | Midgley | 152/545 X |
| 2,994,358 | 8/1961 | Trevaskis | 152/545 X |
| 4,246,949 | 1/1981 | Kawasaki et al. | 152/545 X |
| 4,351,382 | 9/1982 | Corner et al. | 152/DIG. 9 X |
| 4,365,659 | 12/1982 | Yoshida et al. | 152/545 X |
| 4,554,960 | 11/1985 | Pompier | 152/450 |

FOREIGN PATENT DOCUMENTS 1418887 10/1965 France ................................ 152/545

Primary Examiner—Donald E. Czaja
Assistant Examiner—Ramon R. Hoch
Attorney, Agent, or Firm—Brumbaugh, Graves, Donohue & Raymond

[57] ABSTRACT

The pneumatic tire is designed particularly to counteract unwedging of the tire. It is mountable on a rim having a protrusion (referred to as "hump") of ordinary shape. The bead has two bead rings, one of which is close to the bead tip while the other assures the blocking of the former in case of strong axial forces, which permits the bead tip to cooperate more effectively with the hump of the rim.

9 Claims, 3 Drawing Figures

RADIAL CARCASS PNEUMATIC TIRE HAVING TWO BEAD RINGS PER BEAD

The present invention concerns pneumatic tires for passenger cars. More particularly, it refers to the beads of radial carcass tires intended for use without independent inner tubes.

For reasons of safety, such pneumatic tires are mounted on a specially adapted type of rim. These rims are characterized by the fact that they are provided, at least on the outer side of the vehicle, between the deep circumferential groove which is intended for the mounting and the bead seat, with a circumferential protrusion which forms a stop intended to retain the tip of the bead and therefore to avoid the bead falling into the mounting groove. Such protrusions are commonly known as "humps." By way of illustration, the ETRTO standards establish different shapes and sizes thereof. The accidental falling of the bead into the mounting groove is known as "unwedging," a phenomenon which is particularly serious since it results in a loss of control of the vehicle, the tire assembly being without steering power.

The effectiveness of such tire assemblies (rim with hump, plus tire without independent inner tube) is at times found to be insufficient. The constant improvement in the power of cars and the increasingly higher speeds of travel on curves lead to very substantial forces on the beads. In a turn of small radius of curvature traveled with an insufficiently inflated pneumatic tire, on the outer side of the turn, the hump cannot prevent the outer bead from leaving its seat and dropping into the central groove.

Numerous proposals directed at delaying the appearance of this phenomenon are known. Most of them concern rim-tire assemblies. The use of these arrangements prevents dissociating of tire and rim, which presents a definite disadvantage. Among such arrangements, mention may be made of French published patent application No. 2 378 643; the bead must have a rubber tip which fits into a groove specially provided on the bead seat.

Certain proposals are also known which are directed at combating unwedging and which modify only the tire and can therefore be used with an ordinary hump rim. It is possible to increase the blocking (i.e., locking or clamping) of the bead on its seat by decreasing the diameter of the bead as compared with the nominal diameter of the rim and/or by increasing the angle which the lower frustoconical surface of the bead makes with the axis of rotation. For example, French patent No. 1 536 469 provides for inclining the lower face of the bead by 10° while retaining the standard angle of 5° for the bead seat on the rim and for reducing the diameter of the bead by 0.3% as compared with the diameter of the bead seat. In order to increase the effectiveness of the blocking of the bead, French published patent application No. 2 548 970 provides, inter alia, a precise positioning of the principal bead ring which makes it possible to obtain a substantial clamping of the rubber between the bead ring and the bead seat. The effectiveness of an arrangement which combats unwedging is characterized by measuring the inflation pressure from and below which the bead of a pneumatic tire shifts towards the mounting groove of the rim in a standard test. The test consists in a vehicle travelling at a speed of 50 km per hour into a curve, the radius of curvature of which is equal to 20 meters, with a clothoid-shaped connection to the initial straight-line portion. The known arrangements make it possible to reduce substantially the unwedging pressure as compared with the performance of a conventional tire mounted on a rim with a circumferential hump. Those of such arrangements which do not entail simultaneous modifications in the rim prove, however, definitely insufficient under certain conditions of travel or else the effectiveness is obtained to the detriment of the ease of mounting of the tire on the rim.

The object of the present invention is to provide a radial carcass pneumatic tire which is mountable on a rim having at least one circumferential hump and the beads of which tire remain on their bead seat down to a very reduced pressure of inflation.

Another object of the present invention is to provide a tire of this kind which does not require modification of the rim on which it is mounted.

The basic problem of the present invention consists in finding means of permitting axial mobility of the zone of the anchoring of the radial carcass ply or plies so that this zone can follow along in the substantial axial deformations inherent in this type of carcass while assuring firm maintenance and perfect axial immobility of the lower part of the bead which cooperates with the retaining hump provided on the rim and permitting easy mounting on the rim.

The object of the present invention is a pneumatic radial carcass tire provided with a bead having two bead rings one of which serves for the fixing of the bead tip which cooperates with the retaining hump provided on the rim while the other serves for blocking the first bead ring in case of strong axial stress, the use of several bead rings per bead being known per se (see, for example, U.S. Pat. No. 1,548,370).

The pneumatic tire of the present invention which has at least one radial carcass ply and at least one bead containing two bead rings, the tire being mountable on a rim having at least one bead seat which is extended axially inward by a hump for the axial retention of the bead, is characterized by the fact that (a) the first bead ring, of a meridian section of any shape, has a lower diameter such that the length of the circumference is between 0.99 times and 1.01 times the maximum developed length which a cord stretched around the hump can assume in a plane perpendicular to the axis of rotation, (b) the center of gravity of the meridian section of the first bead ring is located in the axially inner half of the width of the meridian section of the bead, (c) the second bead ring, of a meridian section of any shape, has a lower diameter which is greater than the upper diameter of the first bead ring, (d) the center of gravity of the meridian section of the second bead ring is located axially outward of the center of gravity of the meridian section of the first bead ring.

Three preferred embodiments are described below and shown in the accompanying drawings.

Figure 1:
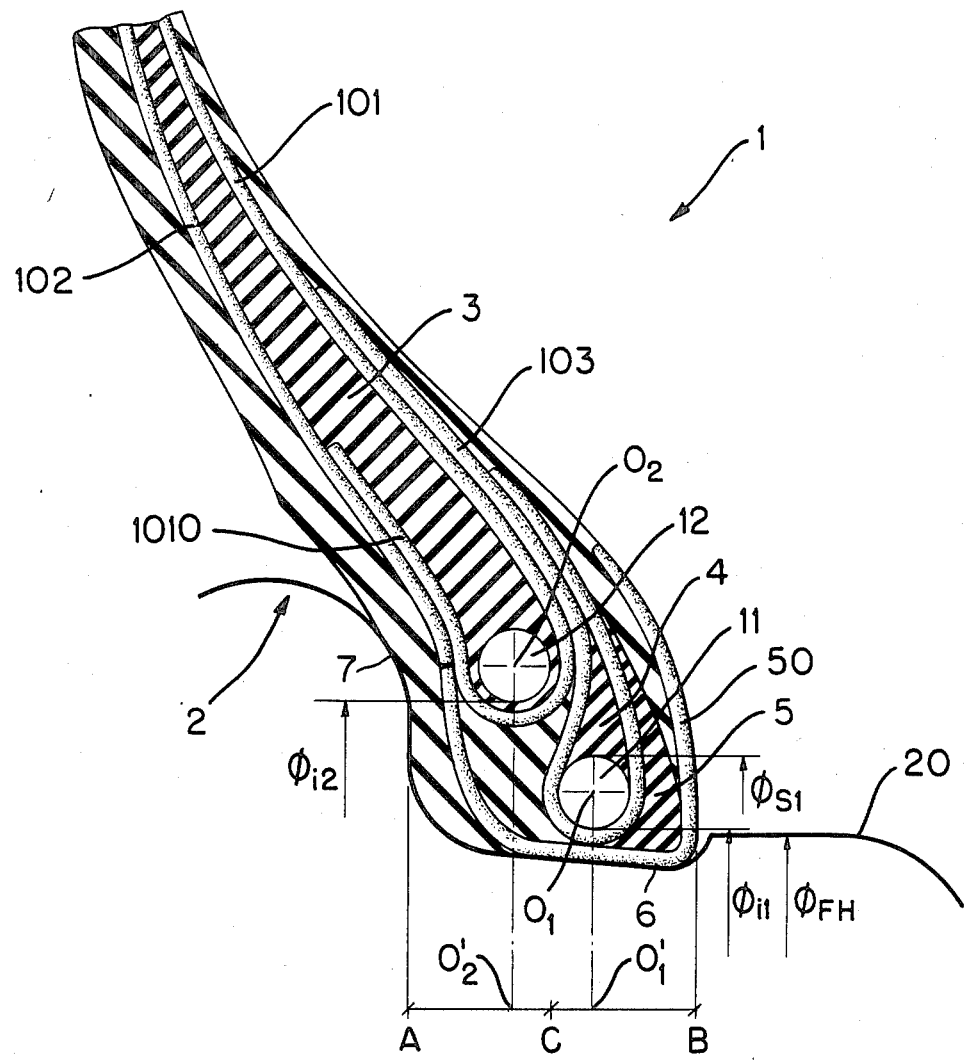
FIG. 1 shows a pneumatic tire bead according to the invention.

FIG. 1 shows the bead (1) of a pneumatic tire mounted on a rim (2) having a bead set (6) and an associated flange (7) and being provided with a hump (20) of the "flat" or "FH" type. The bead (1) has a first bead ring (11) of circular meridian section. The lower diameter $\phi_{il}$ of the first bead ring (11) is such that the length of the circumference $\pi\phi_{il}$ is equal to 1.001 times the maximum developed length which a cord stretched around the selected hump of FH type can assume in a plane perpendicular to the axis of rotation, namely $\pi\phi_{il} = 1.001\pi\phi_{FH}$.

The center of gravity $0_1$ of the meridian section of the first bead ring (11) is located axially at a place such that its orthogonal projection $0'_1$ onto a segment AB parallel to the axis of rotation is located on the axially inner side of the middle C of the segment AB which represents the width of the bead(1), which means that the center of gravity $0_1$ of the meridian section of the first bead ring (11) is located in the axially inner half of the width AB of the meridian section of the bead (1). The second bead ring (12) is of a meridian section identical to the first. The second bead ring (12) is located radially with respect to the first bead ring (11) in such a manner that its lower diameter $\phi_{i2}$ is greater than (and preferably is greater than 1.01 times) the upper diameter $\phi_{sl}$ of the first bead ring (11). The second bead ring (12) is located axially in such a manner that the orthogonal projection $0'_2$ of the center of gravity $0_2$ of its meridian section is axially to the outside of $0'_1$, which means that the center of gravity $0_2$ of the meridian section of the second bead ring (12) is located axially outward of the center of gravity $0_1$ of the meridian section of the first bead ring (11).

A first radial carcass ply (101) is turned upwards around the second bead ring (12), which effects the anchoring of at least one radial carcass ply to the second bead ring (12). The first bead ring (11) is connected to the radial carcass ply (101) via a connecting ply (103) which is turned upward under the first bead ring (11) and applied against the radial carcass ply (101) on the axially inner side of the latter.

The radial carcass may furthermore have one or more other carcass plies, for instance a ply (102) applied to the outside of the turned-over portion (1010) of the carcass ply (101). The various possible arrangements of the additional plies are well known to the man skilled in the art and do not concern the present invention.

The tip (5) of the bead (1) which cooperates with the hump (20) is made of rubber of high modulus of elasticity, comparable to that of the rubber used for the bead-ring stuffings (3) and (4); the base of the bead (1) is reinforced by a protective tongue (50).

If this pneumatic tire is acted on axially when it is at a very low pressure, on the order of 0.1 bar or zero pressure, the applicant has found that the second bead ring (12) moves or shifts very substantially axially towards the inside of the tire until it is located approximately above the hump (20) while, on the other hand, the first bead ring (11) remains entirely axially immovable.

The applicant believes that by its axial displacement, the second bead ring (12) causes radial compression of the bead-ring stuffing (4) and of the tip (5) of the bead (1) which participates in the blocking of the first bead ring (11). In beads having a single bead ring, the unwedging takes place when the bead ring has moved axially until approximately on a line with the hump (20). The applicant believes that by favoring the axial mobility of the second bead ring (12), the latter, in the event of substantial axial forces, assures greater immobility of the first bead ring (11) so that the bead tip (5) cooperates more effectively with the hump (20).

Figure 2:
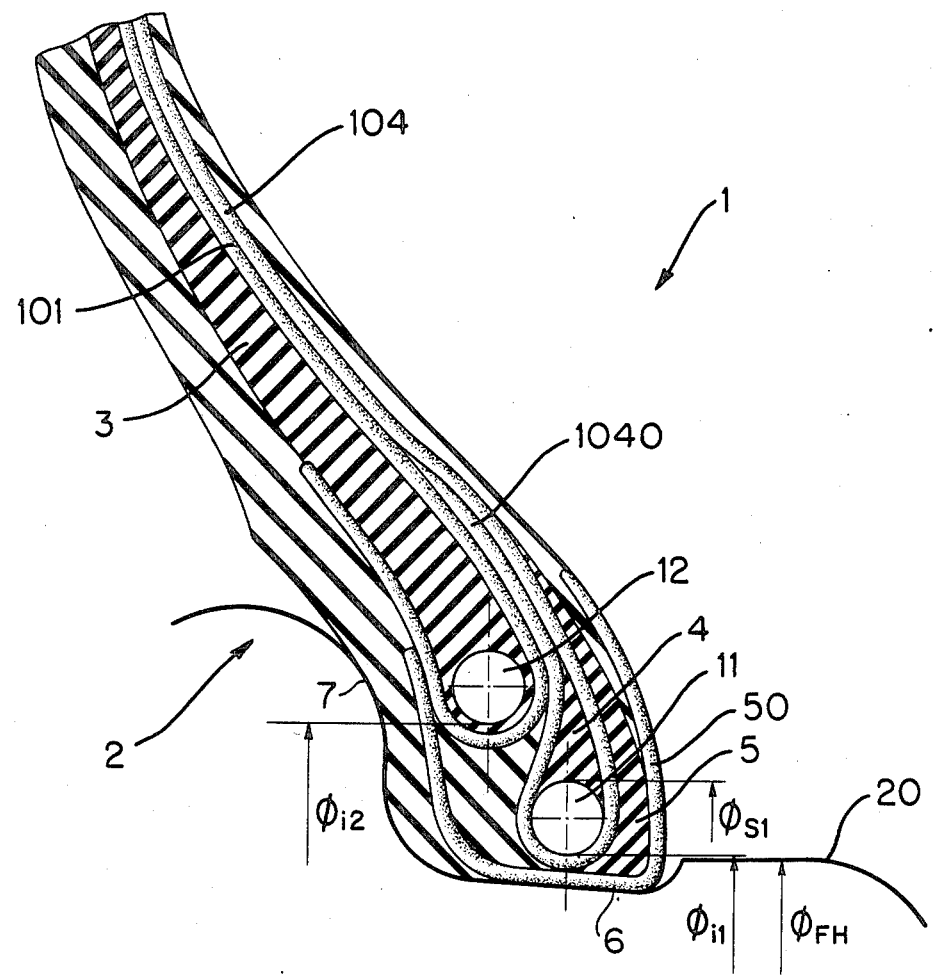
FIG. 2 shows a variant embodiment of the invention.

The bead shown in FIG. 2 differs from the one which has just been described by the fact that the connecting ply consists of the extension (1040) of one (104) of the two carcass plies (101) and (104). Aside from the manner of connecting the first bead ring (11) to the carcass ply (101), the architecture of the bead (1) is identical to the preceding example. The bead rings (11) and (12) are arranged in identical manner. Reference can therefore be had to the previous description for all elements not specific to this variant embodiment.

Figure 3:
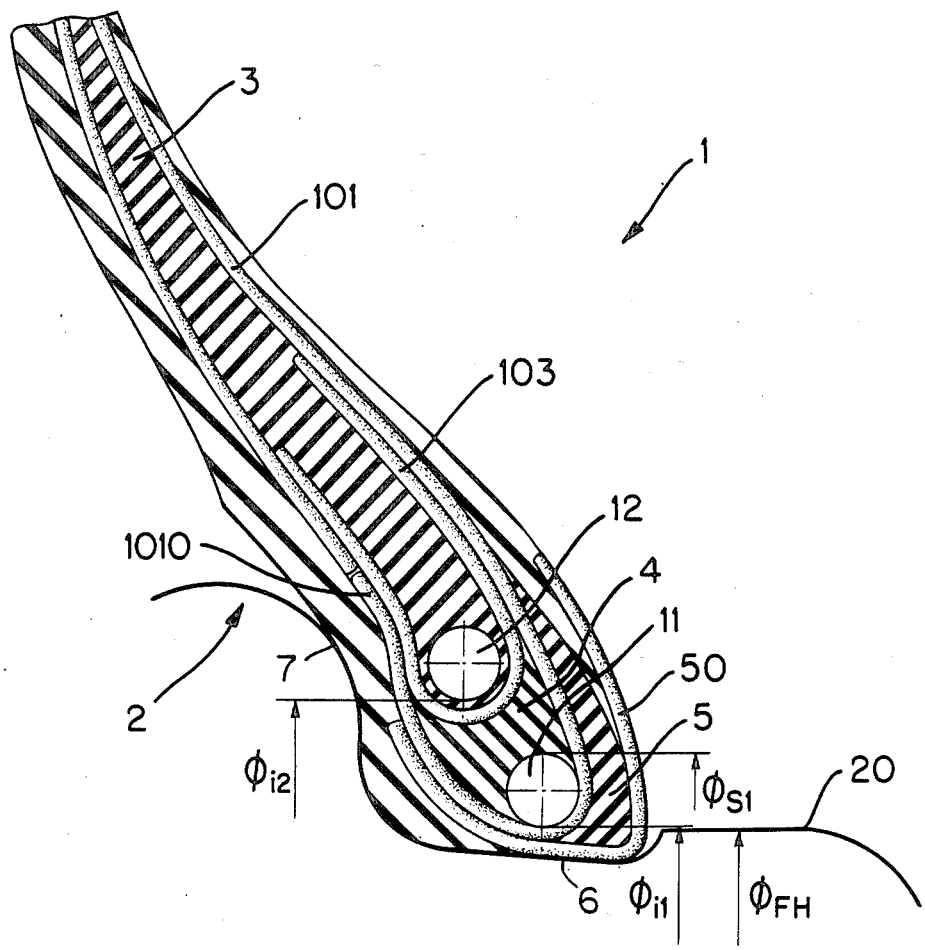
FIG. 3 shows another variant embodiment of the invention.

The embodiment shown in FIG. 3 differs in the anchoring of the radial carcass. The latter has at least one radial carcass ply (101) anchored to the assembly formed by the two bead rings (11) and (12); the radial carcass ply (101) passes axially on the inside of the two bead rings (11) and (12) and its turned-up portion (1010) passes axially on the outside of these bead rings. A connecting ply (103) is also provided, it surrounding the second bead ring (12) and being intended to improve the securing of the second bead ring (12) to the radial carcass.

In order to improve the precision of the positioning of the second bead ring (12), which is to be shiftable axially towards the inside of the tire, it is possible to equip the mold with small attached pieces forming fingers which penetrate into the rubber during the molding at the base and the axially outer side of the bead and play the role of stops which prevent the first bead ring (11) from moving axially towards the outside.

The bead architecture which has just been described makes it possible very effectively to combat unwedging without having to make any change in the rim. Thus any rim profile can be used provided that the axially inner end of the bead seat is terminated by a protrusion forming a stop for the axial retention of the bead. If it is merely desired to increase the ability of the pneumatic tire not to become unwedged upon a turn effected when the inflation pressure is very insufficient, the described bead architecture may be employed only on the one side of the tire, which, of course, must be the outer side of the vehicle equipped with it. However, when it is desired to increase the level of performance so as to permit emergency travel with zero pressure, the two beads must have the configuration according to the invention, each cooperating with a retention hump provided on the rim.

The best performance with respect to controlling unwedging is obtained with a tire in which the lower diameter $\phi_{il}$ of the first bead ring (11) is such that the length of the circumference $\pi\phi_{il}$ is less than 1.005 times the maximum developed length which a cord stretched around the hump selected can assume in a plane perpendicular to the axis of rotation. The mounting of a pneumatic tire according to the invention is effected without difficulty solely under the effect of the inflation pressure. The dismounting remains practically as easy as with an ordinary tire when the lower diameter $\phi_{il}$ is such that $\pi\phi_{il}$ is greater than 0.995 times the maximum developed length which a cord stretched around the selected hump can assume in a plane perpendicular to the axis of rotation. Below this value, dismounting, although more difficult, remains possible.

The standard test described above has made it possible to note unwedging pressures close to zero bar for tires having two identical beads, formed in accordance with one or the other of the embodiments. All other things being equal, the unwedging pressures of ordinary tires are close to 1 bar. On the other hand, the pressure at which the beads position themselves on their seats is comparable to that noted for ordinary tires on the same rim, namely 2.5 bars for a rim of "FH" type.

It goes without saying that the embodiments described are in no way limitative and that one can, without going beyond the scope of the present invention, make various changes, in particular by substitution of equivalent means.

What is claimed is:

1. A tubeless tire having at least one radial carcass ply and at least one bead containing only two bead rings, the tire being mountable on a rim having at least one bead seat and an associated flange, wherein the axially inner end of the bead seat is terminated by a circumferential hump forming a stop for the axial retention of the bead, characterized by the fact that
   (a) a first bead ring, of a meridian section of any shape, has a lower diameter such that the length of the circumference is between 0.99 times and 1.01 times the maximum developed length which a cord stretched around the hump can assumes in a plane perpendicular to the axis of rotation,
   (b) the center of gravity of the meridian section of the first bead ring is located in the axially inner half of the width of the meridian section of the bead,
   (c) a second bead ring, of a meridian section of any shape, has a lower diameter which is greater than the upper diameter of the first bead ring,
   (d) the center of gravity of the meridian section of the second bead ring is located axially outward of the center of gravity of the meridian section of the first bead ring,
   (e) the first and second bead rings being located directly above the bead seat and axially inward of the associated flange when the tire is mounted on the rim,
whereby upon axial stress on the mounted tire during turning the second bead ring moves axially towards the inside of the tire untile the second bead ring is located approximately above the hump while the first bead ring remains axially immovable so as to prevent unwedging of the bead.

2. A tubeless pneumatic tire according to claim 1, characterized by the fact that the lower diameter of the second bead ring is greater than 1.01 times the upper diameter of the first bead ring.

3. A tubeless pneumatic tire according to claim 1, characterized by the fact that the lower diameter of the first bead ring is such that the length of the circumference is between 0.995 times and 1.005 times the maximum developed length which a cord stretched around the hump can assume in a plane perpendicular to the axis of rotation 4. A tubeless pneumatic tire according to any of claims 1 to 3, characterized by the fact that at least one radial carcass ply is anchored to the second bead ring and at least one connecting ply connects the first bead ring to said radial carcass ply.

5. A tubeless pneumatic tire according to claim 4, characterized by the fact that the connecting ply connects the first bead ring to said radial carcass ply by passing over the axial inner side of the second bead ring.

6. A tubeless pneumatic tire according to any of claims 1 to 3, characterized by the fact that at least one radial carcass ply is anchored to the first bead ring and at least one connecting ply connects the second bead ring to said radial carcass ply.

7. A tubeless pneumatic tire according to any of claims 1 to 3, characterized by the fact that at least one radial carcass ply is anchored to the assembly formed by the two bead rings.

8. A tubeless pneumatic tire according to claim 7, characterized by the fact that the second bead ring is surrounded by a connecting ply.

9. A tubeless pneumatic tire according to claim 1, characterized by the fact that the two beads have the same cross-sectional configuration.

* * * * *